United States Patent [19]

Best

[11] Patent Number: 5,393,071

[45] Date of Patent: * Feb. 28, 1995

[54] TALKING VIDEO GAMES WITH COOPERATIVE ACTION

[76] Inventor: Robert M. Best, 777 108th Ave. NE., Ste. 2460, Bellevue, Wash. 98004

[*] Notice: The portion of the term of this patent subsequent to Oct. 25, 2011 has been disclaimed.

[21] Appl. No.: 60,743

[22] Filed: May 12, 1993

Related U.S. Application Data

[63] Continuation-in-part of Ser. No. 614,843, Nov. 14, 1990, abandoned, and Ser. No. 830,379, Jan. 31, 1992, abandoned.

[51] Int. Cl.$^6$ ............................................. A63F 9/22
[52] U.S. Cl. .................................................. 273/434
[58] Field of Search ....... 273/434, 435, 438, DIG. 28, 273/856, 437

[56] References Cited

U.S. PATENT DOCUMENTS

| | | |
|---|---|---|
| 4,305,131 | 12/1981 | Best . |
| 4,333,152 | 6/1982 | Best .................................... 364/521 |
| 4,445,187 | 4/1984 | Best .................................... 364/521 |
| 4,569,026 | 2/1986 | Best .................................... 364/521 |
| 4,846,693 | 7/1989 | Baer . |
| 4,884,972 | 12/1989 | Gasper . |

FOREIGN PATENT DOCUMENTS

0016314 10/1980 European Pat. Off. .
0299831 1/1989 European Pat. Off. .

OTHER PUBLICATIONS

Best: Movies that Talk Back, IEEE Transactions on Consumer Electronics, vol. CE-26, Aug. 1980.
Lombardi: Spellcasting 101, Computer Gaming World, No. 76, Nov. 1990 issue, pp. 20, 22, 94.
Talking Back to the Tube, Newsweek issue of Dec. 3, 1990 pp. 56, 57.

*Primary Examiner*—Jessica J. Harrison
*Attorney, Agent, or Firm*—Graybeal Jackson Haley & Johnson

[57] ABSTRACT

Talking video games provide simulated voice dialog between human players and animated characters on a video or television screen. Two or more animated characters perform cooperative actions and talk about what they are doing or will soon do. They talk to each other and to the human players who control directly or indirectly what the characters do and say. Each scene branches to two or more subsequent scenes. But within each scene there are several branching dialog sequences, thereby providing a large variety of possible dialogs. Pictures and voices are generated from digital data read from a laser-readable disk or stored in a semiconductor memory. Each player has a hand-held controller that displays two or more phrases or sentences. A player responds to what an animated character says by pressing a button next to a selected sentence. An animated character then responds verbally or by action to the selected sentence as if it had been spoken by the human player or says the words the player selected. Speech recognition is not required. Human players are thus given an illusion of having voice dialog with interesting characters involved in cooperative activities.

10 Claims, 9 Drawing Sheets

TALKING VIDEO GAMES WITH COOPERATIVE ACTION

CROSS REFERENCE TO RELATED APPLICATION

This is a continuation-in-part of U.S. patent application Ser. No. 07/614,843, filed Nov. 14, 1990, abandoned in favor of continuation U.S. patent application Ser. No. 08/140,266, filed Oct. 21, 1993, and a continuation-in-part of U.S. patent application Ser. No. 07/830,379, filed Jan. 31, 1992, abandoned.

TECHNICAL FIELD OF THE INVENTION

This invention relates to video games, animated cartoons, and picture/sound synchronization.

BACKGROUND OF THE INVENTION

We are all born with a desire to talk and to be talked to. Listening to other people talk and thereby sharing their emotional experiences is also a desire we are born with and this desire has been exploited in motion picture film and television in which voice sounds are essential. But until recently, voice sounds were seldom used in video games, because of the large amount of memory required.

Human players have long been able to control what characters do and what actions they perform in prior-art video games. But adding voice sounds and talking animated picture sequences to prior-art video games is not enough to simulate a face to face voice conversation. Talking video games such as Wanderers From Ys have animated cartoon sequences that alternate with side-scrolling skill-and-action sequences in which some of the characters talk. Although the actions of some of the characters can be controlled by a human player, characters do not yet talk to each other using words selected by a human player to comment on what they are doing or planning to do.

Talking video games that allow human players to participate in dialog between animated characters that stir human emotions like dramatic films will have lasting appeal, because they will satisfy a basic human desire, the desire to talk with other people.

Prior-art talking video games are disclosed in my U.S. Pat. Nos. 4,305,131; 4,333,152; 4,445,187 and 4,569,026.

It is well known for human players to input choices using any of a variety of input devices such as push buttons, rotatable knobs, pressure sensitive membrane, proximity sensitive pads or screen overlay, light pen, light sensitive gun, joy stick, keyboard, mouse, track ball, moving a cursor or crosshairs or scrolling through highlighted options, speech recognition, etc.

The characters in video games and computer games, especially role-playing games, are of two types: player-controlled characters (or player characters) and non-player characters. A player-controlled character is a human player's animated surrogate or proxy and does what the human player chooses to have him do. Non-player characters are not directly controlled by a human player, but can be indirectly influenced by a human player, either by responding to input from a human player or by responding to what a player-controlled character does or says.

In the prior art, each choice by the human can be immediately followed by a synthesized voice or digitized voice recording that speaks the words selected by the human player, so the human will quickly adjust to the fact that the spoken words he hears for his side of the dialog are initiated by his fingers rather than his vocal cords.

SUMMARY OF THE INVENTION

This is a video game that simulates dialog between a human player and two or more animated characters on a video or television screen. The characters perform coordinated, cooperative actions and talk about what they are doing or soon will do, controlled by a human player or players. Branching is of two kinds: scene branching that results from a selected action or a change from one character to another and dialog branching within each scene.

DETAILED DESCRIPTION OF THE INVENTION

Figure 1:
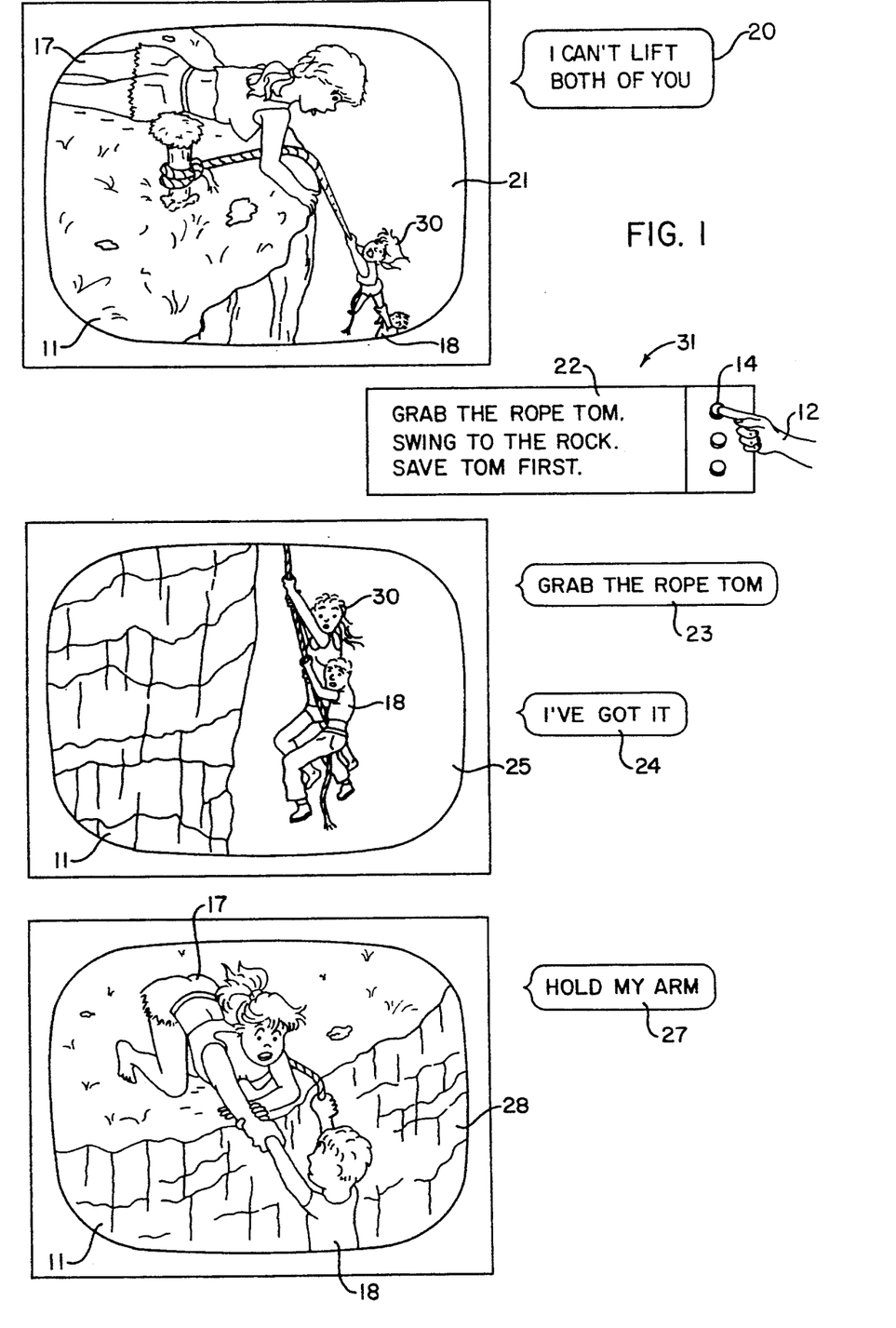
FIG. 1 illustrates an animated talking game embodying the present invention with one human player and three animated characters who talk about and perform a cooperative activity, with one character illustrated as helping the other two characters get out of a dangerous situation.

Referring to FIG. 1, in one embodiment of this invention a video game system generates on a video or television screen 11 several sequences of animated pictures 21, 25, and 28 showing three talking characters engaged in a cooperative rescue activity. The characters have distinctive voices. As sequence 21 begins, characters 18 and 30 are in a dangerous situation and character 17 is trying to rescue them. Character 17 speaks words represented in voice balloon 20 commenting on the rescue activity. A human player 12 in this example holds a hand-held controller 31 (shown more fully in FIG. 2) with three push buttons 14 positioned next to corresponding menu items on a liquid-crystal display 22. Two or more alternative response sentences or phrases are shown on display 22, each being associated with one of the three push buttons 14. The hand of human player 12 is shown pressing one of the buttons 14 that selects one of the alternative sentences to be spoken by character 30.

While human player 12 is deciding which button to press, a linking picture sequence (not shown) continues to show the same scene with the characters trying to pull up on the rope or trying to climb up the rope.

When player 12 selects one of the displayed alternative response sentences, the animated picture changes to sequence 25 and the selected sentence is sounded in the voice of player-controlled character 30 who repeats the words selected by human player 12. These voice sounds are represented in balloon 23 (in this example "GRAB THE ROPE TOM"). Tom is character 18 who is shown in sequence 21 hanging dangerously onto an ankle of character 30. After character 30 says the selected sentence in balloon 23, character 18 grabs hold of the rope and then responds in his voice with the words "I'VE GOT IT" which are the preprogrammed words for the selected sentence. These voice sounds of character 18 are represented in balloon 24. The actions of character 18 are the preprogrammed actions for the selected sentence. If human player 12 had selected a different one of the alternative sentences, the character 18 would have behaved differently and spoken different response words.

Figure 5:
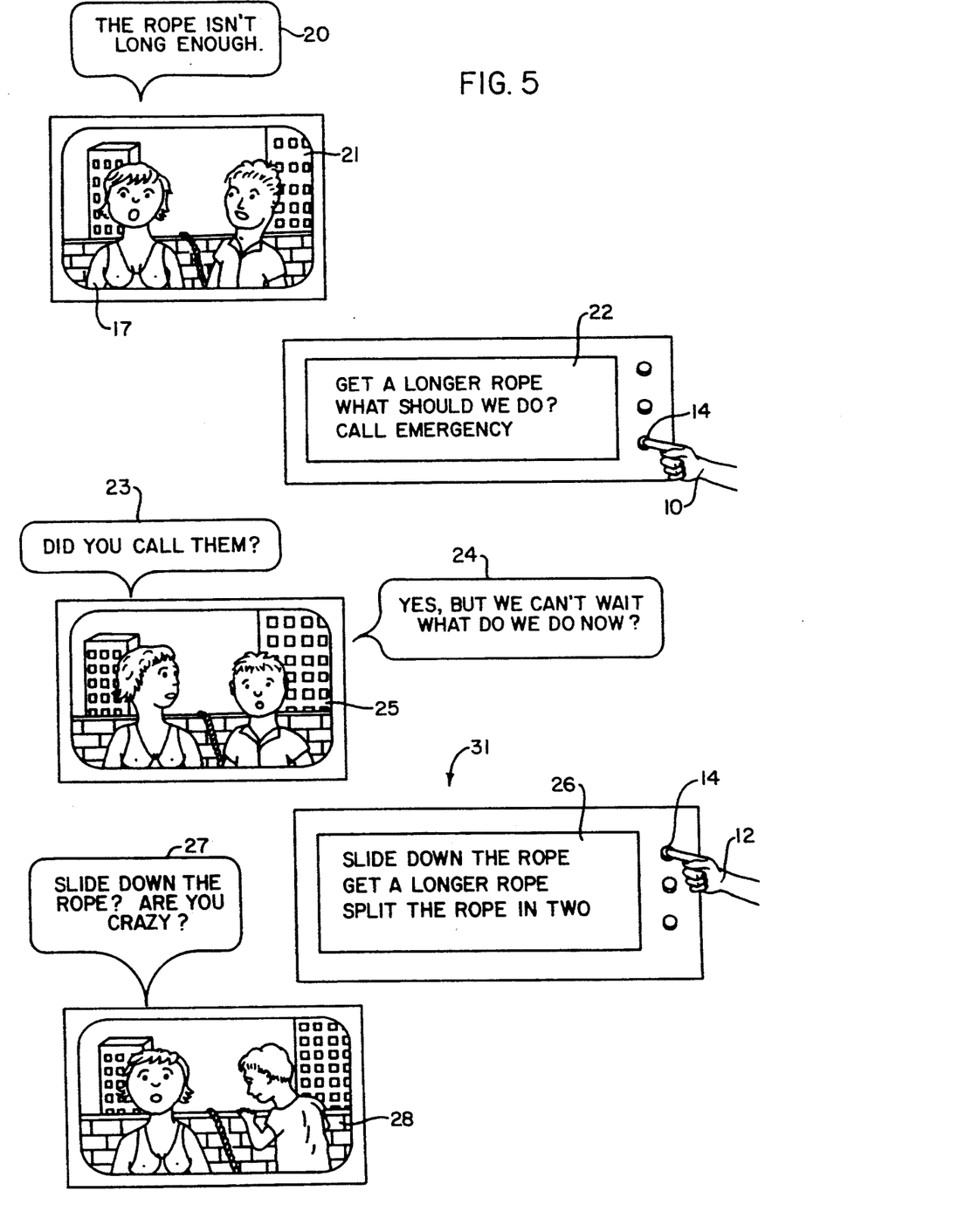
FIG. 5 illustrates branching dialog in an animated talking game sequence in which two animated characters talk to each other and to a human player about the dangerous situation shown in FIG. 4.

The video game system next generates an animated picture sequence showing character 18 climbing the rope. This climbing sequence is not shown in the drawings. When character 18 reaches character 17 in sequence 28, character 17 says in her voice "HOLD MY ARM" (in balloon 27) and the rescue activity proceeds. Thus, the animated characters perform or attempt to perform cooperative rescue actions and talk about these actions while both the actions and voice sounds are controlled directly or indirectly by a human player or players. The words spoken by character 17 may also be selected by a human player from a second menu (not shown) of alternative sentences for her to say. This human player may be a second player 10 as shown in FIG. 5.

After the end of sequence 28, the game system generates another animated sequence, then another sequence, then another sequence, etc. in which a human player controls, directly or indirectly, character actions and voice sounds as described above for FIG. 1.

Figure 7:
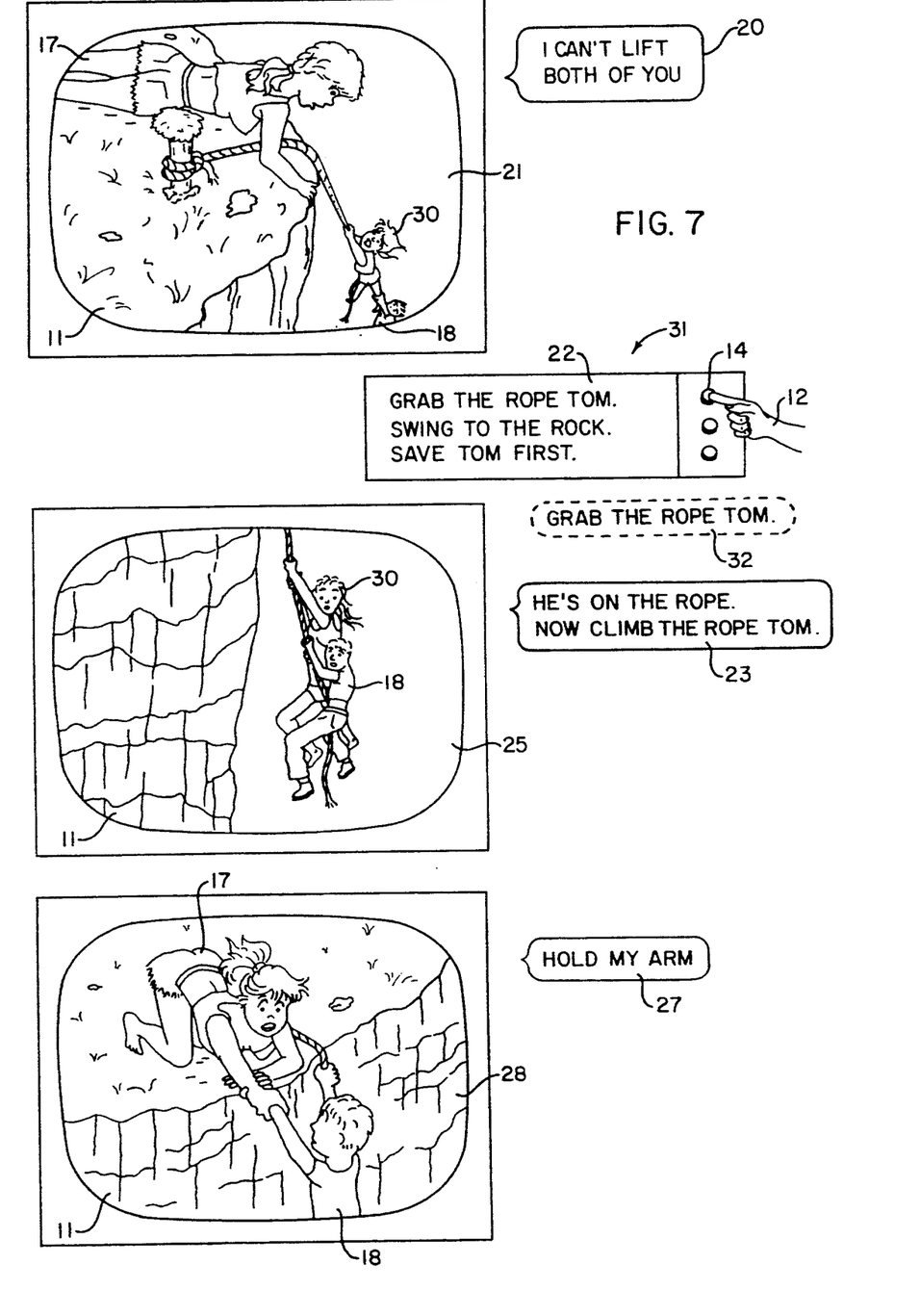
FIG. 7 illustrates an animated talking game with one human player and three animated characters, two of whom talk about and perform a cooperative rescue activity.

A variation of the FIG. 1 game is shown in FIG. 7 and is described below.

Before each game begins, each human player may select which character he or she wants to play. Alternatively, each player-controlled character may be shown on the video screen and the question asked "Who wants to play this character?" for each character shown. The game system then records which of the several hand-held controller 31 responds so that later the alternative sentences for that character will be shown only on the controller for the player who is playing that character (in this example player 12 who plays character 30). A human player may also choose to play a player-controlled character that is not always shown on the video screen, but who may be off-screen and carry on a dialog with on-screen characters.

Figure 2:
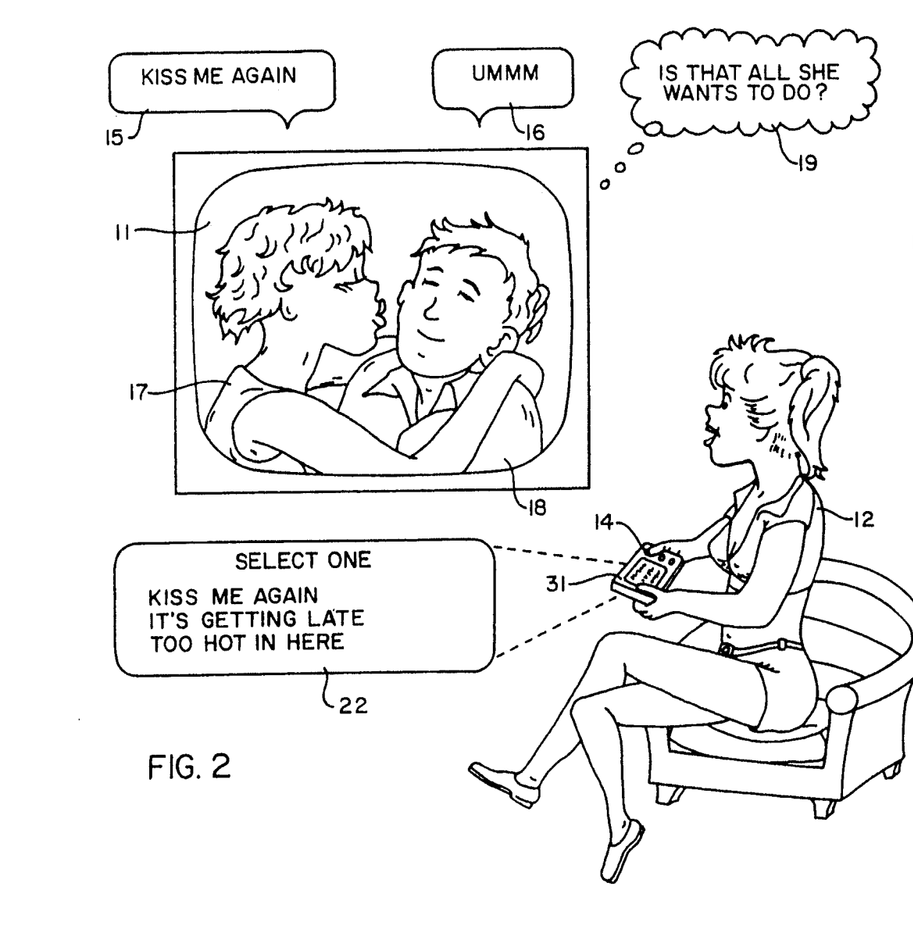
FIG. 2 illustrates a hugging sequence in an animated talking game with one human player and two animated characters who talk to each other about a cooperative activity shown being performed in FIG. 3.

Referring to FIG. 2, in another embodiment of the invention, a video game system displays on the video or television screen 11 an animated picture sequence having two or more animated talking characters 17 and 18. In this example, character 17 is a player-controlled character that human player 12 controls. Player 12 plays the role of character 17 and can talk to character 18 and any other characters in the game through character 17. Player 12 holds the hand-held controller 31 with three push buttons 14 next to the liquid-crystal display 22, shown enlarged in FIG. 2 for clarity. The game system displays three alternative responses on display 22. Player 12 selects one of the displayed responses (in this example "KISS ME AGAIN") with the push button 14 associated with the selected displayed response. Voice sounds 15 for character 17 then say the words selected from display 22. The words are directed at character 18 whose voice sounds 16 then respond to the words of character 17.

The two animated characters 17 and 18 may respond in reverse sequence, that is, the non-player character 18 may say his line first so that the player-controlled character 17 can respond as ordered by human player 12. For example, after player 12 selects "KISS ME AGAIN", character 18 may say "WHAT DO YOU WANT TO DO?" a prerequisite sentence that is not one of the displayed alternatives. Only then will character 17 respond with the selected "KISS ME AGAIN" sentence which is responsive to what character 18 has just said. Such reversals can make the dialog seem more spontaneous.

Voices or sub-titles may also be used to express unspoken thoughts or the thoughts of non-speaking characters such as babies or animals, or inanimate objects such as a thinking rock. Cloud balloon 19 represents an unspoken thought of character 18 in FIG. 2 which is sounded (with mouth not moving) in response to spoken sentence 15 of character 17. Voice sounds for unspoken thoughts may be electronically altered to indicate to players that a voice is not a normal spoken voice. For example, unspoken thoughts can be given a hollow or tremulous sound or a whispering sound by electronically or digitally editing voice sound data before converting to audio.

Figure 3:
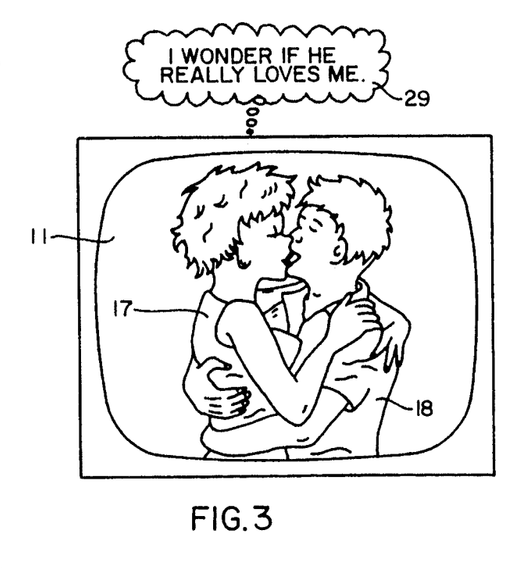
FIG. 3 illustrates a kissing sequence in the animated talking game of FIG. 2 in which the characters perform the cooperative activity talked about in FIG. 2.

Referring to FIG. 3, when characters 17 and 18 perform a competitive or cooperative activity such as kissing, one of the characters may speak (with moving mouth) or think unspoken thoughts (sounded with unmoving or unsynchronized mouth) as in cloud balloon 29, responsive to the action being shown or to what was said or done in the prior sequence shown in FIG. 2 or in response to a phrase selected from display 22.

Figure 4:
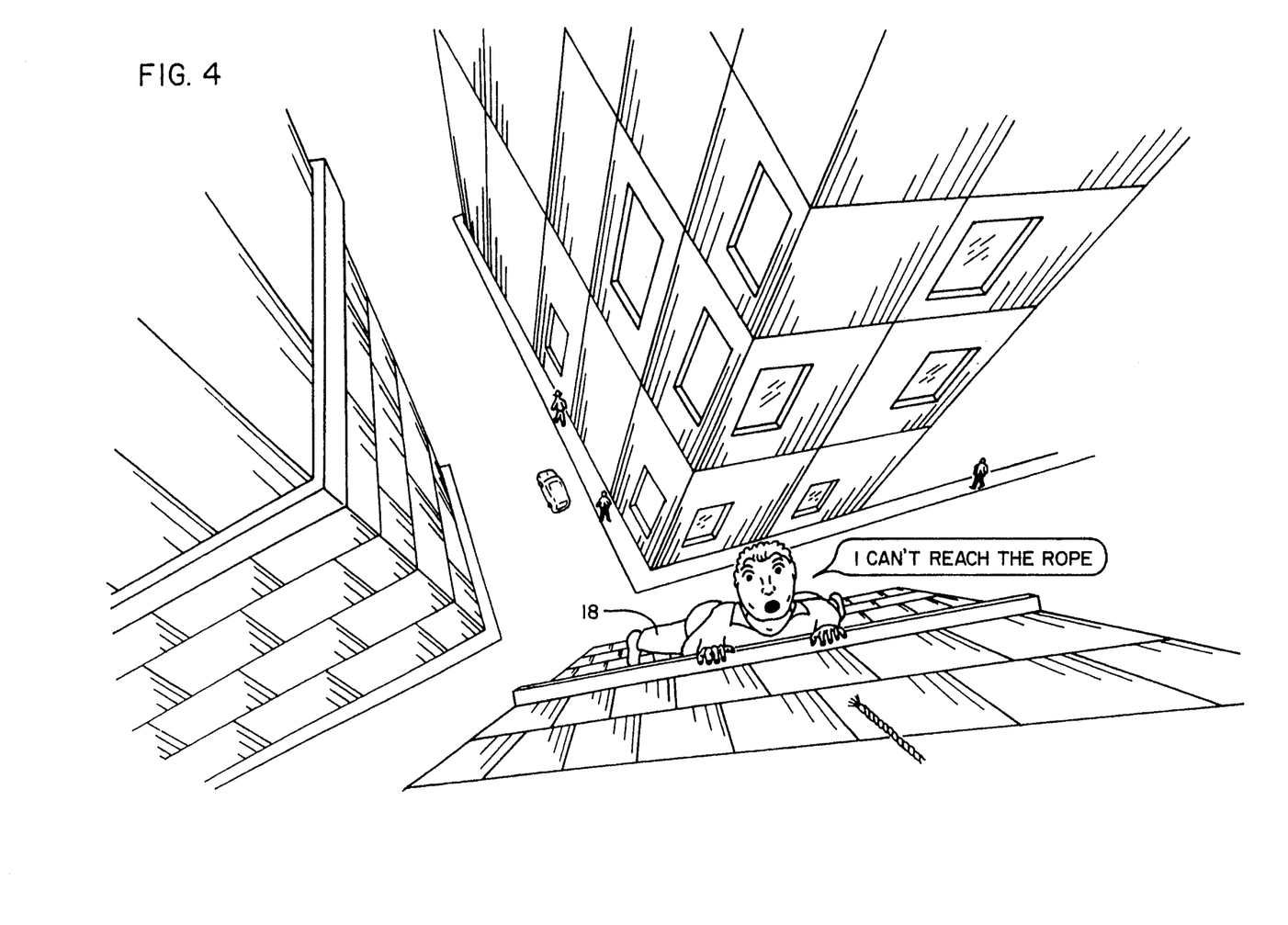
FIG. 4 illustrates a ledge-hanging scene in an animated talking game in which a talking cartoon character requires immediate action by a human player.

Referring to FIG. 4, in another embodiment of this invention a video game system displays on a TV screen an animated picture sequence showing a character 18 hanging by his fingers from a ledge on the outside of a building. His friends on the roof have thrown him a rope which is not long enough to reach character 18. This ledge-hanging situation sets up the next scene shown in FIG. 5 in which two animated characters exchange dialog with one or two human players and with each other regarding the dangerous situation of character 18.

Referring to FIG. 5, picture sequences 21, 25, and 28 are in a roof scene in which two talking characters discuss how to rescue the character shown in FIG. 4.

One or two human players participate in the conversation by "saying" words or phrases or sentences to the animated talking characters who then answer responsively and ask questions or make remarks that lead to the next input by a player. The alternatives shown on display 22 are suggested solutions to the problem posed in spoken sentence 20. When a human player 10 presses button 14 next to "Call emergency", one of the characters responds in sequence 25 by asking spoken question 23 to the other character who responds with spoken question 24 directed to the human player. Question 24 is also accompanied by alternative actions 26 on display 22. When player 12 presses the button 14 next to "Slide down the rope", a character comments on this choice of action with spoken sentence 27 in sequence 28. Thus, a simulated verbal dialog can continue through several exchanges of words within the same scene.

After the problem of how to rescue character 18 in FIG. 4 is decided by a human player, one of the FIG. 5 characters such as character 17 may be shown performing actions that result in the rescue. Such actions may include character 17 helping character 18 over the top of the building in an animated picture sequence that is equivalent to sequence 28 in FIG. 1.

Figure 6:
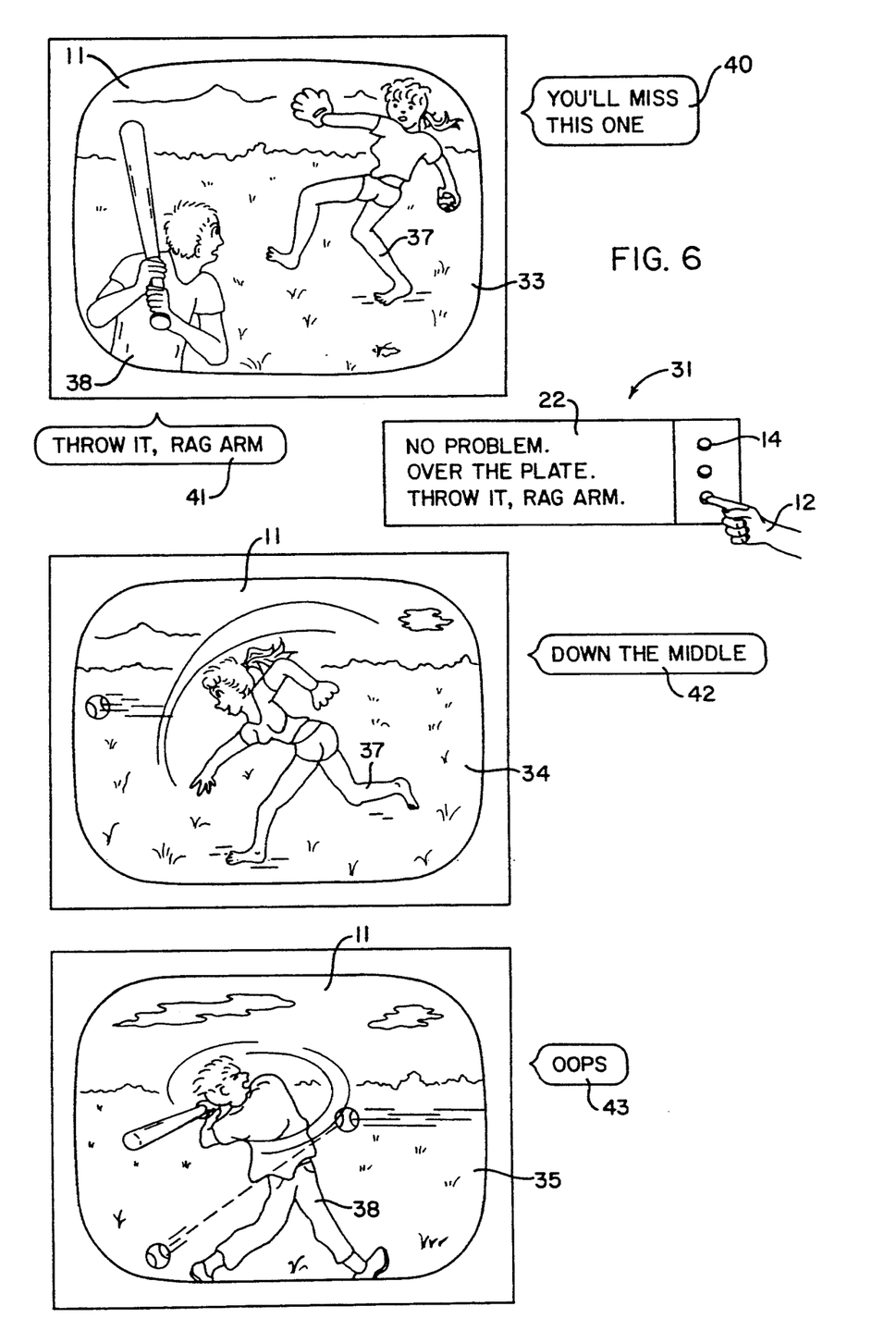
FIG. 6 illustrates a baseball scene in an animated talking game with one human player and two animated characters who talk about and perform a cooperative activity.

Referring to FIG. 6, in one embodiment of this invention a video game system generates on the video or television screen 11 several sequences of animated pictures 33, 34, and 35 showing two talking characters 37 and 38 engaged in a cooperative or competitive baseball playing activity. The characters have distinctive voices. As sequence 33 begins, character 37 is ready to pitch a baseball in the direction of character 38 who is holding a bat ready to hit the ball. Character 37 speaks words represented in voice balloon 40 commenting on the ability of character 38 to perform the cooperative activity. The human player 12 in this example holds the hand-held controller 31 with three push buttons 14 positioned next to display 22 showing a menu of alternative response sentences or phrases. The hand of human player 12 is shown pressing one of the buttons 14 that selects one of the alternative sentences. When player 12 selects a sentence, the words of the selected sentence are sounded in the voice of character 38. These words are represented in balloon 41.

The animated picture then changes to sequence 34 showing character 37 pitching the ball, after which she comments on her performance of the cooperative activity. These voice sounds are represented in balloon 42.

The animated picture then changes to sequence 35 showing character 38 swinging the bat at the ball. When he unsuccessfully hits the ball, he voices a remark about his lack of success in performing this cooperative activity. These voice sounds are represented in balloon 43. Thus, the animated characters 37 and 38 perform or attempt to perform cooperative or competitive actions and talk about these actions, while both the actions and voice sounds are controlled directly or indirectly by a human player or players. The words spoken by character 38 in balloon 43 may be selected by a human player from a second menu (not shown) of alternative sentences for him to say or be automatically selected by the game system based on the sentence previously selected by the player to be spoken by character 38 from the alternative sentences of display 22.

The actions of characters 37 and 38 should change depending on what a character says. For example, if character 38 voices an irritating remark, character 37 may place her hands on her hips in a defiant stance with an annoyed facial expression, and reply with an equally rude remark, then resume the ballgame. Or character 37 may pitch the ball differently depending on what a character says. Or character 38 may swing the bat differently depending on what a character says. The cooperative action should change depending on human player input and not be unchangably fixed like a movie film. Hence, the choices made by a human player on controller 31 influence what characters say and the actions that characters perform.

Referring to FIG. 7, in another embodiment of this invention the video game system generates on the video or television screen 11 animated picture sequences 21, 25, and 28 showing three talking characters engaged in a cooperative rescue activity. This game differs from the game illustrated in FIG. 1 in that the human player 12 does not directly control the words spoken by any of the three characters 17, 18, or 30 shown in FIG. 7. And the words selected by human player 12 in FIG. 7 are sounded in a voice that differs from the voices of the three characters.

As sequence 21 begins, characters 18 and 30 are in a dangerous situation and character 17 is trying to rescue them. Character 17 speaks words represented in voice balloon 20 commenting on the rescue activity. Two or more alternative response sentences or phrases are shown on display 22, each being associated with one of the three push buttons 14. The hand of human player 12 presses one of the push buttons 14 that selects one of the alternative sentences to provide the player's side of the dialog. The selected sentence may be voiced by no character or by an off-screen player-controlled character who is the human player's surrogate.

When player 12 selects one of the displayed alternative response sentences, the animated picture changes to sequence 25 and the selected sentence is sounded. These voice sounds are represented in balloon 32 (in this example "GRAB THE ROPE TOM") and repeat the selected sentence. Tom is character 18 who then grabs hold of the rope. If human player 12 had selected a different one of the alternative sentences, a different or the same character may perform whatever action is selected. Character 30 then responds to this action or to the player's surrogate sentence of balloon 32 with responsive voice sounds in the voice of character 30 as represented in balloon 23. The words used by character 30 are the preprogrammed words for the selected sentence. The sentence in balloon 23 is not the same as the sentence in balloon 32 in this example. If human player 12 had selected a different one of the alternative sentences, character 30 would have acted differently and spoken different response words.

After character 30 vocally responds by saying the words in balloon 23, the video game system generates an animated picture sequence showing character 18 climbing the rope or performing whatever action is suggested by the words in balloon 23. This climbing sequence is not shown in the drawings. When character 18 reaches character 17 in sequence 28, character 17 says in her voice "HOLD MY ARM" (in balloon 27) and the rescue activity proceeds. Thus, the animated characters perform or attempt to perform cooperative rescue actions and talk about these actions while both the actions and voice sounds are controlled directly or indirectly by a human player or players. The words spoken by character 17 may also be selected by a human player from a second menu (not shown) of alternative sentences for her to say. This human player may be a second player 10 as shown in FIG. 5.

Figure 8:
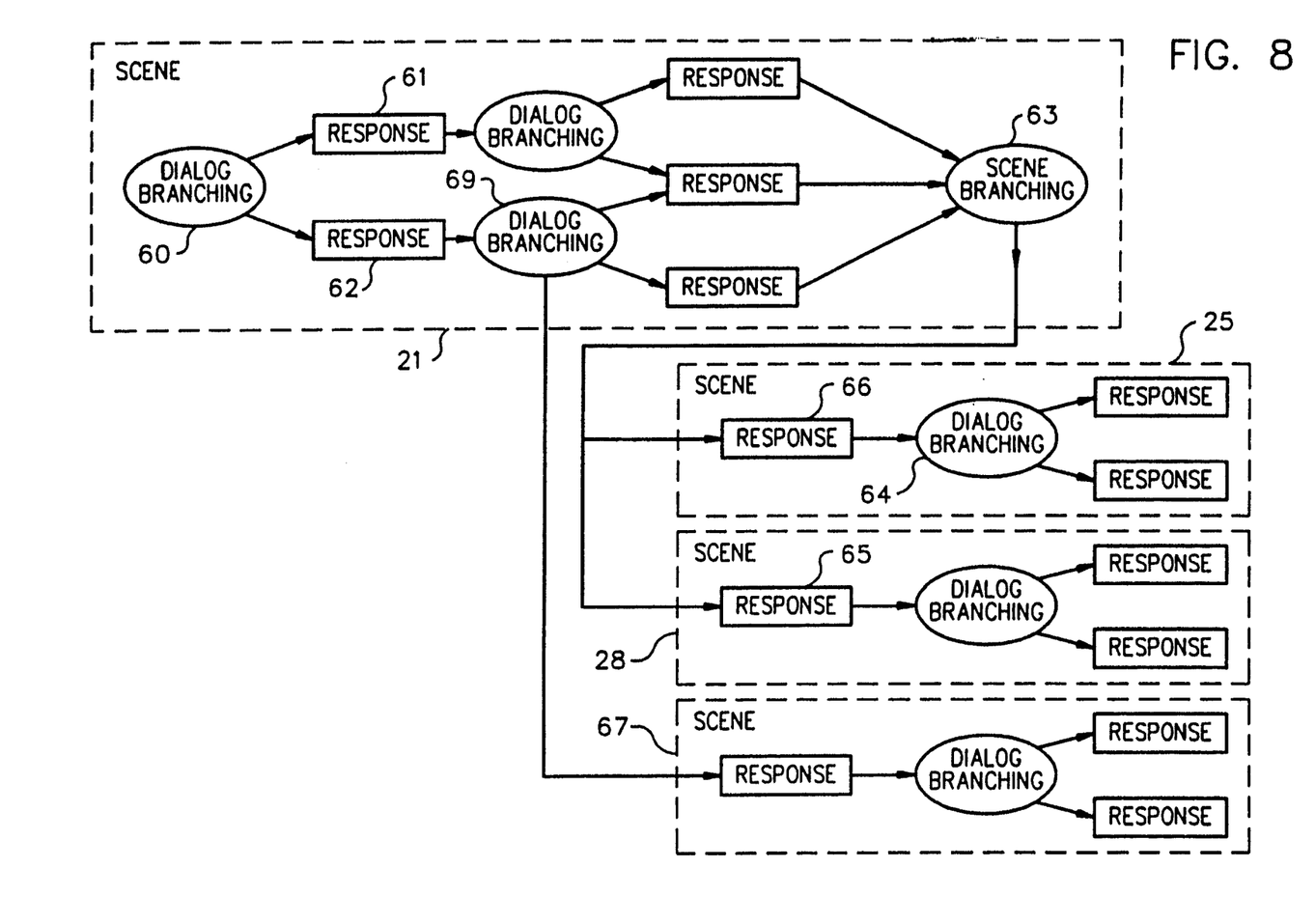
FIG. 8 is a flow diagram illustrating scene branching and dialog branching within each scene.

Referring to FIG. 8, a flowchart illustrates the distinction between branching dialog and branching scenes that are also shown in FIGS. 1–7. For example, in FIG. 8 at dialog branch point 60 in scene sequence 21, a player is presented with two or more alternatives to choose from which correspond to the menu of verbal expressions displayed on hand-held controller 31 in FIGS. 1–7. Each of the alternative selections will result in a different verbal response 61 or 62 by one or more of the animated characters, but does not result in a scene change in this instance. However, the alternative actions at branch point 63 in FIG. 8 will result in a scene change. For example, selection from display 22 of alternative actions in FIG. 1 will result in a scene change either to the rope climbing sequence 25 or to the rescue sequence 28. Branch point 69 in FIG. 8 may result in either a scene change to sequence 67 or a dialog branch depending on a player's selection. Dialog branching should occur in each scene to provide a large variety of possible dialog sequences.

If the player in FIG. 1 selects the first of the three alternative actions shown on display 22, the scene changes to the rope climbing sequence 25 which begins with response 66 in FIG. 8. Response 66 includes voice sounds 23 of character 30 in FIG. 1 and associated facial and body movements followed by voice sounds 24 of character 18 and associated facial and body movements.

Figure 9:
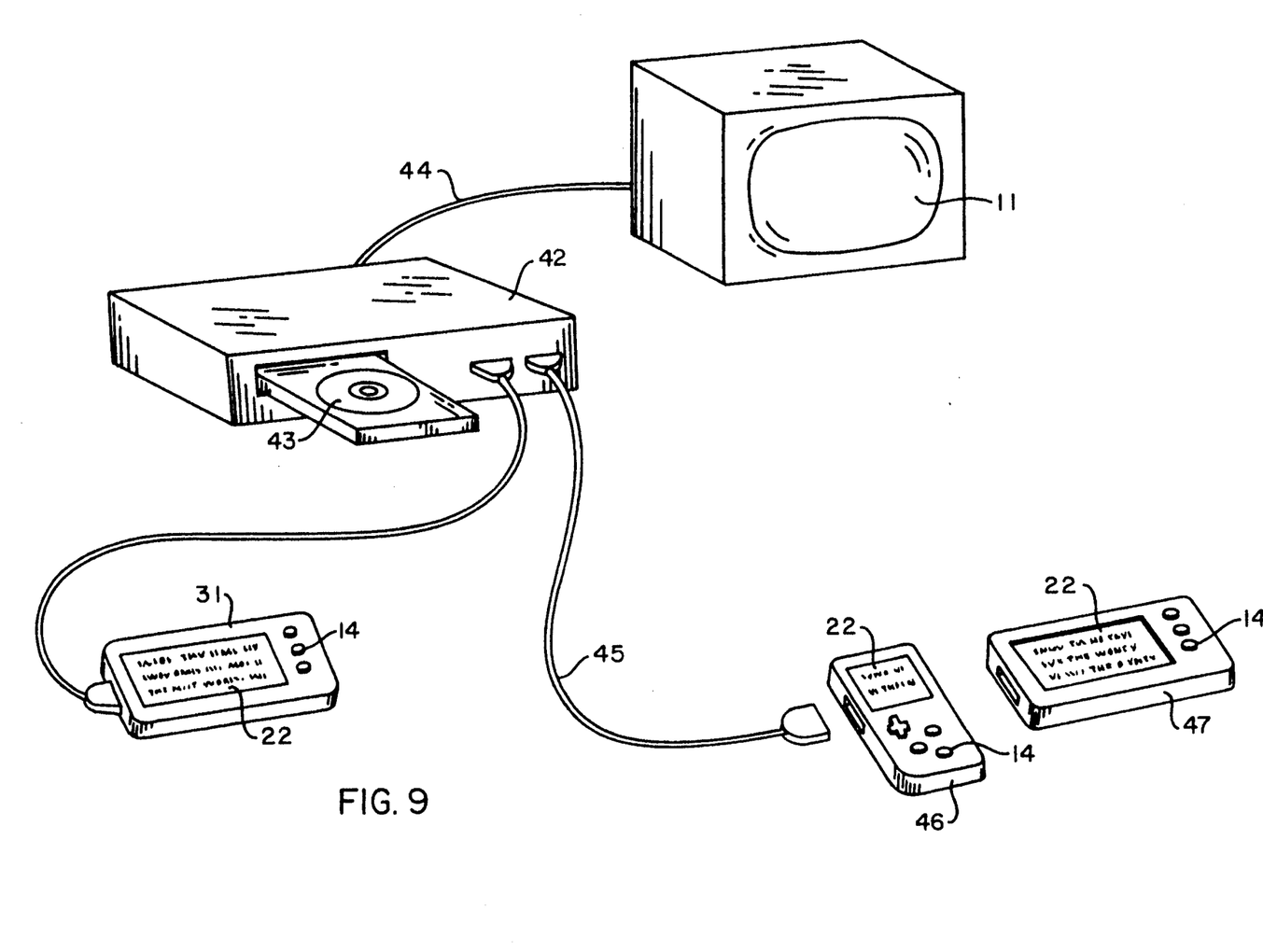
FIG. 9 is a pictorial view of a video game system having a CD-ROM disc drive connected to a TV set or video monitor with auxilary devices for displaying prompting words.

Referring to FIG. 9, video game system 42 is connected by cable 44 to a television or video screen 11 and to one or more hand-held control units 31 and 47 or portable game system 46, each having three push buttons 14 next to a liquid-crystal display 22 of a variable menu of verbal expressions. Infra-red or radio signals may be used instead of-cables. System 42 includes a disk reader that reads digital data from a CD-ROM disk 43, or write-once disk or card or other medium containing digital data from which system 42 generates animated picture signals, compressed audio for voice and other sounds, synchronizing data, and digitized words for display on units 31 and 47. Portable game system 46 with appropriate ROM program cartridge may substitute for units 31 and 47. Cable 45 connects game system 42 to display unit 31, 46 or 47 and transmits alternative prompting words or other verbal expressions for display. Cable 45 also transmits push-button 14 selection signals to system 42.

Figure 10:
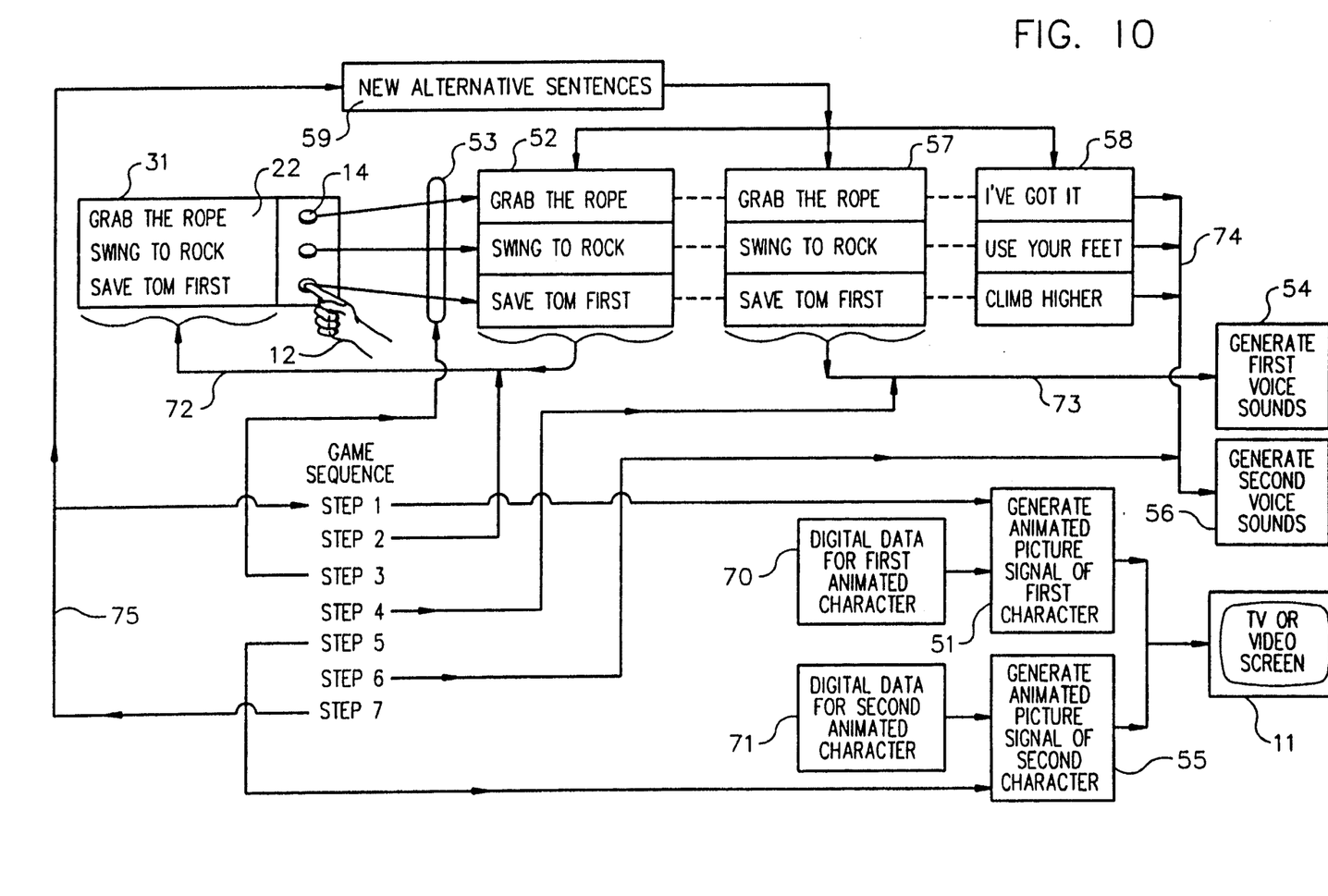
FIG. 10 is an apparatus block diagram illustrating flow of data and method steps to generate a cyclical game play with two animated characters.

Referring to FIG. 10 which is a block diagram of a special-purpose apparatus for performing some of the video game illustrated in FIG. 1, the apparatus performs steps 1 through 7 in sequence, so that the animated picture sequence on the television or video screen 11 alternates between two characters in this example. In step 1, animated picture generator 51 generates a video or RF signal for display on video screen 11 of an animated picture from digitized animated character data stored in memory 70 of a first talking character. In step 2, hand-held controller 31 displays on the liquid-crystal display 22 several alternative sentences or other verbal expressions from data read via line 72 from memory 52 storing the alternative sentences. In step 3, one of the push buttons 14 generates a selection signal (indicated by one of lines 53) selecting a sentence from among the alternative sentences in memory 52 and also selects the corresponding (indicated by dotted lines) digitized voice recordings from memory 57 and 58. In step 4, voice signal generator 54 generates a signal for output as first voice sounds from the selected digitized voice recording (via line 73) in memory 57 that expresses or responds to the words displayed on controller 31. In step 5, animated picture generator 55 generates a signal for display on video screen 11 of an animated picture from digitized animated character data stored in memory 71 of a second talking character. In step 6, voice signal generator 56 generates a signal for second voice sounds from the selected digitized voice recording (via line 74) in memory 58 that respond to the words generated by voice signal generator 54. In step 7, a new set of alternative sentences from disk or memory 59 is loaded into memory 52, 57 and 58 and the sequence of steps begins again with step 1.

To allow each background scene to be used with different animated characters who can move around against the background scene, the digital animation data for the background scene should be stored separately from the digital animation data for each character. Similarly, to allow each character to say many different sentences without a scene change, the digitized voice data should be independent of the animation data. In the preferred embodiment, animated character video, voice sound sequences and prompting word sequences are generated independently from separately stored digital data. Dialog data that is not used in one scene may be used later in a different scene with the same or different characters. The voice data may consist of sequences of codes or compressed digital recordings of words, phrases, word segments or phonemes in several distinctive voices so that each character can speak thousands of preprogrammed words or sentences. Similarly, the digital data for each animated character's body may be stored separately from sprite data for moving lips, facial expressions, and gestures, so that each character and its distinctive voice can be lip-synchronized with different mouth movements depending on which branch the dialog takes. The digital data for each animated character may also combine body, lips, expressions, gestures and voice sounds.

When a human player presses one of the buttons 14 (FIG. 1, 2, 5, 6 or 7) the game system may generate a voice sound speaking the selected sentence as a substitute for the player's side of the dialog. The animated character then "responds" as if the generated voice sounds had been spoken by the human player. Because the player selects the words which are actually sounded, he will quickly adjust to the fact that the spoken words he hears for his side of the dialog are initiated by his fingers rather than his vocal cords. This "echo" voice repeating the selected words is important for games with multiple human players so that each player will hear what each of the other players has "said" to on-screen characters. Pushing one of the buttons 14 selects both a simulated verbal response to the words previous spoken by an animated character and also selects a new dialog sequence that corresponds to the simulated verbal response shown on display 22. The selected dialog sequence includes the face and voice of the animated character speaking words which are responsive to the player's selected verbal response.

The illustrated embodiments of the invention make use of the hand-held controller 31 having one push-button 14 for each menu item on display 22 and echo voices to avoid sub-titles on the video or television screen. Alternatively, the menus may be shown on the video or television screen instead of on the hand-held display and be selected by players using hand-held controllers 31 that lack displays.

Each character can be an animated cartoon, digitized live action, analog live action, a sprite or the like, and be player controlled or not. The term "verbal expression" means any word, words, phrase, sentence, question, expletive, curse, keyword, combination of keywords, symbol, icon, or any meaningful human voice sound such as "huh?" or "hmmm" or laughter or scream. The word kissing is used herein to mean simulated touching of one animated character's mouth to another animated character's mouth or other body part.

When writing the present patent application I included some material from the parent applications and omitted some of the material. This was done to reduce the size of the application and should not be interpreted as a disclaimer of the omitted material.

The phrase "cooperative action" is used broadly herein to encompass actions between friendly video characters and competitive actions between opposing video characters in such activities as rescues, chases, searching, ball games, fighting, and other simulated games, contests and activities.

Although I have described the preferred embodiments of my invention with a degree of particularity, it is understood that the present disclosure has been made only by way of example and that equivalent steps and components may be substituted and design details changed without departing from the spirit and scope of my invention.

I claim:

1. A method of electronically simulating voice conversations between at least two talking animated characters, the words of one character being selected by a human player, comprising the steps of:
   (a) digitally storing a catalog of distinctive voices for at least two talking characters, each in the form of voice sound data representing a plurality of sentences, phrases, word segments or phonemes;
   (b) digitally storing a preprogrammed branching dialog between a first animated character and a second animated character, each branch comprising a plurality of alternative verbal expressions;
   (c) generating a video signal representing an image of said first and second characters for display on a video screen;
   (d) displaying on a hand-held controller apparatus a first set of alternatively selectable verbal expressions describing preprogrammed actions of an animated character, each expression corresponding to a branch in said dialog;
   (e) receiving from said hand-held controller a manually initiated signal representing a selected verbal expression in said first set of verbal expressions, thereby selecting a branch in the dialog and a corresponding selected action of an animated character.
   (f) digitally reading from said catalog of voices first voice sound data that corresponds to said selected verbal expression for the voice of said first character;
   (g) generating an audio signal from said first voice sound data representing the voice of said first character speaking said selected verbal expression;
   (h) generating a video signal representing an image of an animated character performing said selected action in accordance with said selected verbal expression;
   (i) digitally reading from said catalog of voices second voice sound data for the voice of said second character speaking the verbal expression that follows next in the selected branch of the dialog;
   (j) generating an audio signal from said second voice sound data representing the voice of said second character; and
   (k) displaying on said hand-held controller apparatus a second set of alternatively selectable verbal expressions that follows next for said first character in the selected branch of the dialog.

2. The method of claim 1, wherein said hand-held controller is a portable game system with program cartridge.

3. The method of claim 1, wherein said video signal is changed to show moving lips on the face of the first character when said audio signal is generated from said first voice sound data; and wherein said video signal is changed to show moving lips on the face of the second character when said audio signal is generated from said second voice sound data.

4. The method of claim 3, wherein said moving lips are lip-synchronized with the corresponding voices in said audio signal.

5. A method of electronically simulating voice conversations between at least two on-screen talking animated characters and an off-screen talking character, comprising the steps of:
   (a) digitally storing a catalog of distinctive voices for at least three talking characters, each in the form of voice sound data representing a plurality of sentences, phrases, word segments or phonemes;
   (b) digitally storing a preprogrammed branching dialog between a first on-screen character and a second on-screen character and an off-screen character, each branch comprising a plurality of alternative verbal expressions;
   (c) generating a video signal representing an image of said first and second on-screen characters for display on a video screen;
   (d) displaying on a hand-held controller apparatus a first set of alternatively selectable verbal expressions describing preprogrammed actions of an animated character, each expression corresponding to a branch in said dialog;
   (e) receiving from said hand-held controller a manually initiated signal representing a selected verbal expression in said first set of verbal expressions, thereby selecting a branch in the dialog and a corresponding selected action of an animated character;
   (f) digitally reading from said catalog of voices first voice sound data that corresponds to said selected verbal expression for the voice of said off-screen character;
   (g) generating an audio signal from said first voice sound data representing the voice of said off-screen character speaking said selected verbal expression;
   (h) generating a video signal representing an image of an animated character performing said selected action in accordance with said selected verbal expression;
   (i) digitally reading from said catalog of voices second voice sound data for the voice of said first on-screen character speaking the verbal expression that follows next in the selected branch of the dialog;

(j) generating an audio signal from said second voice sound data representing the voice of said first on-screen character;

(k) digitally reading from said catalog of voices third voice sound data for the voice of said second on-screen character speaking the verbal expression that follows next in the selected branch of the dialog;

(l) generating an audio signal from said third voice sound data representing the voice of said second on-screen character; and (m) displaying on said hand-held controller apparatus a second set of alternatively selectable verbal expressions that follows next for said off-screen character in the selected branch of the dialog.

6. The method of claim 5, wherein said video signal is changed to show moving lips on the faces of said on-screen characters synchronized with the corresponding voices in said audio signal.

7. The method of claim 5, wherein said hand-held controller is a portable game system with program cartridge.

8. The method of claim 5, wherein said selected verbal expression for said off-screen character is displayed on said video screen.

9. A method of electronically simulating voice conversations between at least two talking animated characters, the words of the characters being selected by two corresponding human players, comprising the steps of:

(a) digitally storing a catalog of distinctive voices for a least two talking characters, each in the form of voice sound data representing a plurality of sentences, phrases, word segments or phonemes;

(b) digitally storing a preprogrammed branching dialog between a first animated character and a second animated character, each branch comprising a plurality of alternative verbal expressions;

(c) generating a video signal representing an image of said first and second characters for display on a video screen;

(d) displaying on a first hand-held controller apparatus a first set of alternatively selectable verbal expressions describing preprogrammed actions of an animated character, each expression corresponding to a branch in said dialog;

(e) receiving from said first hand-held controller a manually initiated signal representing a first selected verbal expression in said first set of verbal expressions, thereby selecting a branch in the dialog and corresponding selected action of an animated character;

(f) digitally reading from said catalog of voices first voice sound data that corresponds to said first selected verbal expression for the voice of said first character;

(g) generating an audio signal from said first voice sound data representing the voice of said first character speaking said first selected verbal expression;

(h) generating a video signal representing an image of an animated character performing said selected action in accordance with said selected verbal expression;

(i) displaying on a second hand-held controller apparatus a second set of alternatively selectable verbal expressions that follows next for said second character in the selected branch of the dialog;

(j) receiving from said second hand-held controller a manually initiated signal representing a second selected verbal expression in said second set of verbal expressions, thereby selecting a next branch in the dialog;

(k) digitally reading from said catalog of voices second voice sound data that corresponds to said second selected verbal expression for the voice of said second character; and (l) generating an audio signal from said second voice sound data representing the voice of said second character speaking said second selected verbal expression.

10. A method of electronically simulating voice conversations between at least two on-screen talking animated characters and two off-screen talking characters, comprising the steps of:

(a) digitally storing a catalog of distinctive voices for at least four talking characters, each in the form of voice sound data representing a plurality of sentences, phrases, word segments or phonemes;

(b) digitally storing a preprogrammed branching dialog between a first on-screen character and a second on-screen character and a first off-screen character and a second off-screen character, each branch comprising a plurality of alternative verbal expressions;

(c) generating a video signal representing an image of said first and second on-screen characters for display on a video screen;

(d) displaying on a first hand-held controller apparatus a first set of alternatively selectable verbal expressions describing preprogrammed actions of an animated character, each expression corresponding to a branch in said dialog;

(e) receiving from said first hand-held controller a manually initiated signal representing a first selected verbal expression in said first set of verbal expressions, thereby selecting a branch in the dialog and a corresponding selected action of an animated character;

(f) digitally reading from said catalog of voices first voice sound data that corresponds to said first selected verbal expression for the voice of said first off-screen character;

(g) generating an audio signal from said first voice sound data representing the voice of said first off-screen character speaking said first selected verbal expression;

(h) generating a video signal representing an image of an animated character performing said selected action in accordance with said selected verbal expression;

(i) digitally reading from said catalog of voices second voice sound data for the voice of said first on-screen character speaking the verbal expression that follows next in the selected branch of the dialog;

(j) generating an audio signal from said second voice sound data representing the voice of said first on-screen character;

(k) displaying on a second hand-held controller apparatus a second set of alternatively selectable verbal expressions that follows next for said second off-screen character in the selected branch of the dialog;

(l) receiving form said second hand-held controller a manually initiated signal representing a second selected verbal expression in said second set of verbal expressions, thereby selecting a next branch in the dialog;

(m) digitally reading from said catalog of voices third voice sound data that corresponds to said second selected verbal expression for the voice of said second off-screen character;

(n) generating an audio signal from said third voice sound data representing the voice of said second off-screen character speaking said second selected verbal expression;

(o) digitally reading from said catalog of voices fourth voice sound data for the voice of said second on-screen character speaking the verbal expression that follows next in the selected branch of the dialog; and (p) generating an audio signal from said fourth voice sound data representing the voice of said second on-screen character.

* * * * *